United States Patent
Kakihara et al.

(10) Patent No.: US 10,727,728 B2
(45) Date of Patent: Jul. 28, 2020

(54) LINEAR MOTOR

(71) Applicant: KABUSHIKI KAISHA YASKAWA DENKI, Kitakyushu-shi, Fukuoka (JP)

(72) Inventors: Masanobu Kakihara, Fukuoka (JP); Shogo Makino, Fukuoka (JP)

(*) Notice: Subject to any disclaimer, the term of this patent is extended or adjusted under 35 U.S.C. 154(b) by 50 days.

(21) Appl. No.: 15/987,915

(22) Filed: May 24, 2018

(65) Prior Publication Data
US 2018/0269766 A1   Sep. 20, 2018

Related U.S. Application Data

(63) Continuation of application No. PCT/JP2016/084748, filed on Nov. 24, 2016.

(30) Foreign Application Priority Data

Nov. 27, 2015   (JP) .................................. 2015-232394

(51) Int. Cl.
*H02K 41/03*   (2006.01)

(52) U.S. Cl.
CPC ......... *H02K 41/031* (2013.01); *H02K 41/033* (2013.01)

(58) Field of Classification Search
CPC ..... H02K 41/03; H02K 41/031; H02K 41/033
See application file for complete search history.

(56) References Cited

U.S. PATENT DOCUMENTS

| | | | |
|---|---|---|---|
| 6,713,899 B1* | 3/2004 | Greubel | H02K 41/031 310/12.18 |
| 6,831,379 B2* | 12/2004 | Ohto | H02K 41/031 310/12.18 |
| 6,949,846 B2* | 9/2005 | Sugita | H02K 41/031 310/12.15 |
| 7,893,569 B2* | 2/2011 | Jajtic | H02K 41/033 310/12.18 |

(Continued)

FOREIGN PATENT DOCUMENTS

| | | |
|---|---|---|
| CN | 101515730 | 8/2009 |
| CN | 101515731 | 8/2009 |

(Continued)

OTHER PUBLICATIONS

International Search Report dated Feb. 7, 2017 for PCT/JP2016/084748.

(Continued)

*Primary Examiner* — Burton S Mullins
(74) *Attorney, Agent, or Firm* — Soei Patent & Law Firm (57) ABSTRACT

A linear motor includes a stator and a mover. The stator has a plurality of salient poles. The mover includes a plurality of first teeth; a plurality of coils respectively mounted on the periphery of the plurality of first teeth; a plurality of first magnets respectively buried within the first teeth; a second tooth provided outside the plurality of first teeth; and a second magnet buried within the second tooth. The second tooth includes a first portion on the opposite side of the first teeth with respect to the second magnet; and a second (Continued)

portion close to the first teeth with respect to the second magnet. In a protruding direction of the second tooth, an edge of the first portion is farther from the stator than an edge of the second portion.

18 Claims, 6 Drawing Sheets

(56) References Cited

U.S. PATENT DOCUMENTS

| | | | | |
|---|---|---|---|---|
| 7,915,769 | B2 * | 3/2011 | Jajtic | H02K 41/033 |
| | | | | 310/12.24 |
| 8,384,252 | B2 * | 2/2013 | Kakihara | H02K 41/031 |
| | | | | 310/12.24 |
| 9,118,237 | B2 * | 8/2015 | Makino | H02K 41/033 |
| 2003/0098620 | A1 | 5/2003 | Ohto et al. | |
| 2009/0206681 | A1 | 8/2009 | Jajtic et al. | |
| 2009/0206682 | A1 | 8/2009 | Jajtic | |
| 2011/0221284 | A1 | 9/2011 | Kakihara et al. | |
| 2013/0049489 | A1 | 2/2013 | Makino et al. | |
| 2014/0232209 | A1 | 8/2014 | Sugita et al. | |
| 2016/0268883 | A1 * | 9/2016 | Kakihara | H02K 41/033 |

FOREIGN PATENT DOCUMENTS

| | | |
|---|---|---|
| CN | 102195440 | 9/2011 |
| CN | 103997187 | 8/2014 |
| CN | 104578680 | 4/2015 |
| EP | 2091138 | 8/2009 |
| JP | 2003-134791 | 5/2003 |
| JP | 4103066 | 6/2008 |
| JP | 2009-195103 | 8/2009 |
| JP | 2009-219199 | 9/2009 |
| JP | 2011-188709 | 9/2011 |
| JP | 2014-161179 | 9/2014 |
| KR | 10-2013-0023038 | 3/2013 |
| WO | WO-2006082134 A1 * | 8/2006 ........... H02K 41/031 |
| WO | WO-2008015153 A1 * | 2/2008 ........... H02K 41/031 |

OTHER PUBLICATIONS

International Preliminary Report on Patentability with Written Opinion dated May 29, 2018 for PCT/JP2016/084748.
Office Action issued in Japanese Patent Application No. P2017-552683, dated Jun. 18, 2019 (with English partial translation).
Office Action issued in Chinese Patent Application No. 201680068131.0, dated Jun. 12, 2019 (with English full translation).
Zhu Dehong et al, "Comparison of a novel modular and complementary linear flux-switching permanent magnet motor with different phase arrangements", 2015 IEEE International Conference on Industrial Technology (ICIT), IEEE, Mar. 17, 2015, p. 2636-p. 2641, XP032785744.
Extended Search Report in corresponding European Application No. 16868603.8, dated Aug. 23, 2019.
Office Action issued in Korean Patent Application No. 10-2018-7018036, dated Aug. 5, 2019 (with English translation).
Office Action issued in Japanese Patent Application No. P2017-552683 , dated Mar. 17, 2020 (with English partial translation).
Office Action issued in Chinese Patent Application No. 201680068131.0 , dated Mar. 2, 2020 (with full English translation).
Office Action issued in Japanese Patent Application No. P2017-552683, dated Nov. 19, 2019 (with English partial translation).

* cited by examiner

LINEAR MOTOR

CROSS-REFERENCE TO RELATED APPLICATIONS

This application is a continuation application of PCT Application No. PCT/JP2016/084748, filed Nov. 24, 2016, which claims the benefit of priority from Japanese Patent Application No. 2015-232394, filed on Nov. 27, 2015, the entire contents of which are incorporated herein by reference.

BACKGROUND

1. Field

The present disclosure relates to a linear motor.

2. Description of the Related Art

Japanese Unexamined Patent Publication No. 2009-219199 discloses a linear motor that includes an armature provided with an armature core, an armature winding, and a permanent magnet; and a stator provided with a plurality of salient poles aligned along a moving direction of the armature.

SUMMARY

A linear motor according to the present disclosure includes a stator and a motor. The stator is provided along a first route having a linear shape and the mover is configured to move along the first route. The stator includes a plurality of salient poles aligned along the first route. The mover includes: a plurality of first teeth aligned along the first route, protruding toward the stator; a plurality of coils respectively mounted on the periphery of the plurality of first teeth; a plurality of first magnets respectively buried (or "embedded" or "lodged") in the plurality of first teeth. The mover further includes a second tooth provided outside the plurality of first teeth in the first route, protruding toward the stator; and a second magnet buried (or "embedded" or "lodged") in the second tooth. The second tooth has a first portion on the opposite side of the first teeth with respect to the second magnet, and a second portion close to the first teeth with respect to the second magnet. The first portion has an edge farther from the stator than an edge of the second portion.

DESCRIPTION OF EMBODIMENTS

Example embodiments will be hereinafter described in detail with reference to the accompanying drawings. It should be noted that elements having common elements and features will be denoted with the same reference numerals and redundant explanations will be omitted herein. A linear motor 1 according to one embodiment, may be used in a conveyance system (or a transport system) that carries and conveys (or transports) an object such as a linear actuator unitized as a power source, or a workpiece and generates a thrust along a travel path, for example a linear route (hereinafter referred to as a "first route" R1 or "linear path"). The linear motor 1 is also applicable to a conveyance system (or a transport system) that accommodates people.

Figure 1:
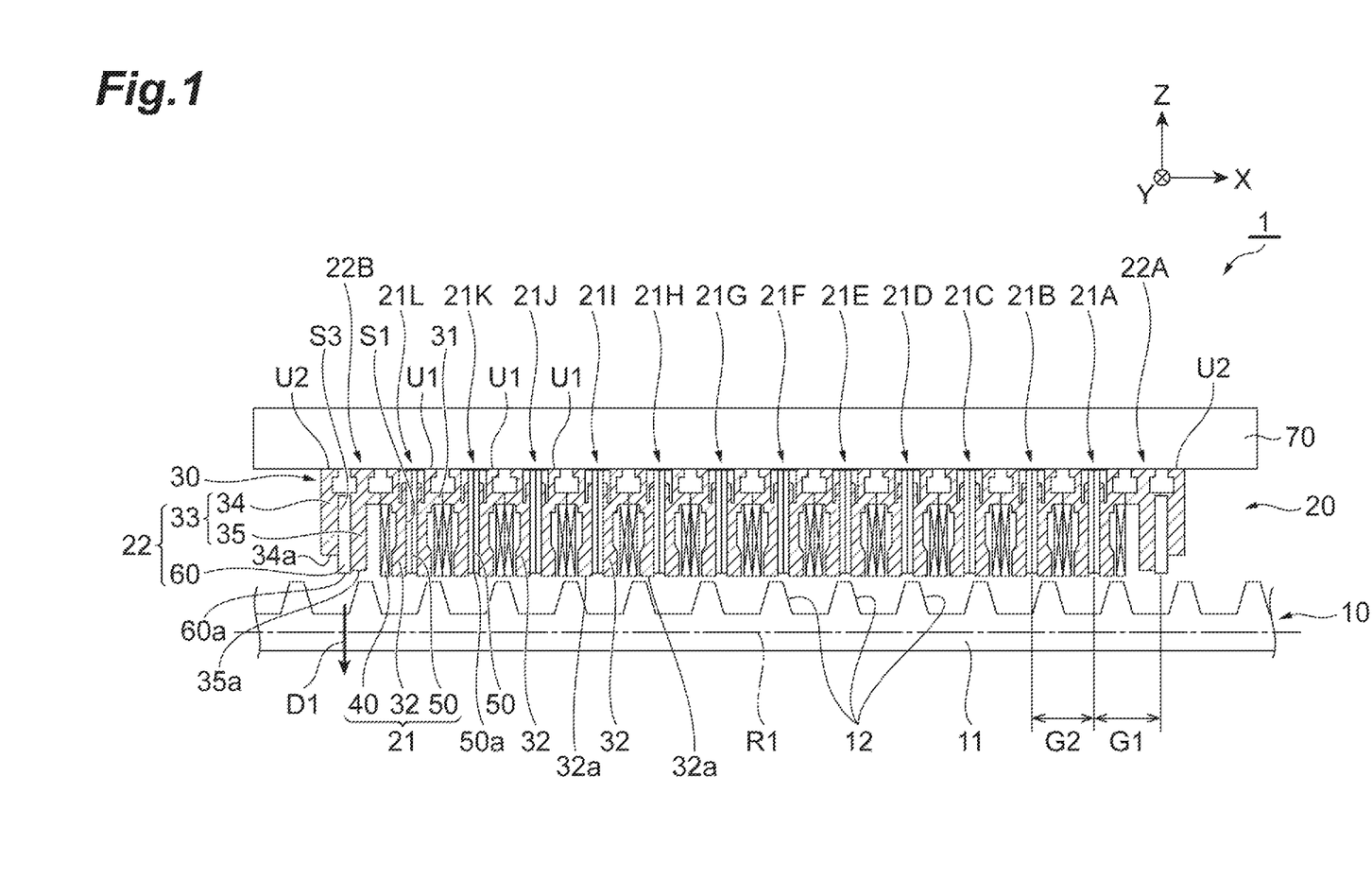
FIG. 1 is a schematic view of a linear motor.

As illustrated in FIG. 1, the linear motor 1 has a stator 10 and a mover 20. The stator 10 is provided along the first route R1, and the mover 20 moves along the first route R1. The stator 10 and the mover 20 are positioned to face each other in a direction perpendicular to the first route R1. In the following description, for the purpose of illustration, a "vertical direction" represents a direction in the Z-axis of FIG. 1, for example the mover 20 is above the stator 10 in the vertical direction or orientation. The terms "back and forth" indicates a direction in the X-axis of FIG. 1. The first route R1 extends along X-axis of FIG. 1.

[Structure of Stator]

The stator 10 has a yoke 11 and a plurality of salient poles 12. The yoke 11 extends along the first route R1. The plurality of salient poles 12 is arranged in succession along the first route R1 and protrudes upward (in a positive direction of the Z-axis in the drawing) from the yoke 11. The stator 10 includes a soft magnetic material such as steel. The stator 10 may be formed by laminating magnetic steel plates such as silicon steel plates in the horizontal direction (the Y-axis direction in the drawing) or may be formed by compressing soft magnetic composites.

[Structure of Mover]

The mover 20 configured to move along the route R1, includes a mover core 30, a plurality of coils 40, and a plurality of first magnets 50.

The mover core 30 has a yoke 31 and a plurality of teeth (or of "first teeth") 32. The yoke 31 extends along the first route R1. The plurality of first teeth 32 is arranged along the first route R1 and protrudes downward (toward the stator 10, in a negative direction of the Z-axis in the drawing) from the yoke 31. In the vertical direction (the Z-axial direction in the drawing), the first teeth 32 are configured to face the salient poles 12, so as to extend toward the salient poles leaving a gap between the teeth 32 and the salient poles 12. The mover core 30 includes a soft magnetic material such as steel. The mover core 30 may be formed by laminating magnetic steel plates such as silicon steel plates in the horizontal direction (the Y-axial direction in the drawing) or may be forming by compressing soft magnetic composites.

The plurality of coils 40 is mounted on the periphery of the plurality of first teeth 32, respectively. For example, each of the coils 40 includes a conductive strand coated with an insulating material. The coils 40 are disposed in such a manner that the conductor strands wind around the first teeth 32 and are fixed to the first teeth 32 by adhesion or the like. In the plurality of coils 40, the adjacent coils 40 wind in opposite directions (the conductive strands wind in opposite directions).

The plurality of first magnets 50 is buried (or embedded) within the plurality of first teeth 32, respectively. The terms "buried" and "embedded" may refer to a configuration in which each of the magnets 50 are located substantially between two of the first teeth 32, and not necessarily covered by the first teeth 32. It should be noted that the term "buried" or "embedded" includes not only a case where the magnets are buried completely (e.g. where the magnets do not extend further than the teeth) but also a case where the magnets are buried partially, such that the magnets extend beyond a threshold line along the ends of first teeth 32. The same shall apply hereinafter. A central portion of each first tooth 32 in a direction along the first route R1 is formed with, for example, a magnet slot S1 that opens downward. It should be noted that the "central portion" indicates a region including a center position. The same shall apply hereinafter. The first magnets 50, which may comprise a permanent magnet such as a ferrite magnet, are inserted into the magnet slots S1 while magnetization directions of the first magnets 50 (directions in which the N pole and the S pole are aligned) are oriented along the first route R1, and the first magnets 50 are fixed to the first teeth 32 by adhesion or the like.

The plurality of first magnets 50 is provided so that the magnetization directions of adjacent ones of the first magnets 50 are opposite to each other. Accordingly, the mover core 30 is formed in an alternating manner, with a portion magnetized to the N pole by the two adjacent first magnets 50 and a portion magnetized to the S pole by the two adjacent first magnets 50.

Hereinafter, the first teeth 32, the coils 40 mounted on the first teeth 32, and the first magnets 50 embedded within the first teeth 32 are collectively referred to as first magnetic poles 21 of the mover 20. The number of the first magnetic poles 21 may be appropriately set, depending on driving systems.

As an example, the mover 20 has twelve sets of first magnetic poles 21A to 21L aligned in order along the first route R1. The first magnetic poles 21A to 21L generate moving magnetic fields corresponding to the supply of three-phase AC power. For example, a U-phase AC is supplied to the first magnetic poles 21A, 21B, 21G, 21H, a V-phase AC is supplied to the first magnetic poles 21C, 21D, 21I, 21J, and a W-phase AC is supplied to the first magnetic poles 21E, 21F, 21K, 21L. Accordingly, each of the six first magnetic poles 21A, 21B, 21C, 21D, 21E, 21F and the six first magnetic poles 21Q 21H, 21I, 21J, 21K, 21L generates a moving magnetic field. Actions of these moving magnetic fields on the salient poles 12 of the stator 10 leads to generation of a thrust that moves the mover 20.

[Second Tooth and Second Magnet]

The mover core 30 further includes a second tooth 33 (or "external tooth"), and the mover 20 further includes second magnet 60 (or "external magnet" or "outer magnet"). The second tooth 33 is provided at an extremity of the plurality of first teeth 32 in the direction of the first route R1 (i.e. located outside the plurality of teeth) and protrudes downward from the yoke 31 (that is, toward the stator 10). In other words, the second tooth 33 is provided outside the outermost first teeth 32 in the arrangement of the plurality of first teeth 32.

The second magnet 60 is embedded within the second tooth 33. For example, a magnet slot S3 is downwardly open-ended and is formed in a central portion of the second tooth 33 in the direction along the first route R1. The second magnet 60, a permanent magnet such as a ferrite magnet, is inserted into the magnet slot S3 while a magnetization direction of the second magnet 60 is along the first route R1, and the second magnet 60 is fixed to the second tooth 33 by adhesion or the like. The second magnet 60 is provided so that magnetization directions of the second magnet 60 and of an adjacent one of the first magnets 50 are opposite to each other.

Hereinafter, a portion in the second tooth 33 on the opposite side of the first teeth 32 with respect to the second magnet 60 is referred to as a first portion 34. A portion in the second tooth 33 close to the first teeth 32 with respect to the second magnet 60, is referred to as a second portion 35. That is to say, the second portion 35 is located between the external magnet 60 and the plurality of teeth 32.

In the vertical direction (that is, a protruding direction D1 of the first teeth 32 and the second tooth 33), an edge 34a of the first portion 34 is on the upper side (the opposite side of the stator 10) with respect to an edge 35a of the second portion 35. In other words, the edge 34a is farther from the stator 10 (upper edges of the salient poles 12) than the edge 35a in the protruding direction D1. As an example, a protruding length of the first portion 34 from the yoke 31 is shorter than a protruding length of the second portion 35 from the yoke 31. Thus, the second portion 35 may extend closer to the stator 10 as compared with the first portion 34. That is to say, the second portion 35 extends closer to a "reference point" or to a "reference line" of the stator 10 as compared with the first portion 34, wherein the reference line runs substantially in a same direction or orientation as the route R1. In some embodiments, the reference point or the reference line may be defined along the route R1. In some embodiments, the reference point may be located along a peak of one of the salient poles 12. In some embodiments, the reference line may be defined as a line that connects the peaks of the salient poles 12. In some embodiments, the reference line may be defined as extending along a base of the stator from which the salient poles 12 extend. In some embodiments, when the reference line extends along the route R1 or the base of the stator, then the salient poles 12 are substantially uniform in shape and size, so that their peaks runs substantially parallel to the reference line.

In the protruding direction D1 of the second tooth 33, the edge 34a of the first portion 34 and the edge 35a of the second portion 35 may be on the upper side (the opposite side of the stator 10) with respect to edges 32a of the first teeth 32. In other words, the edges 34a and 35a may be farther from the stator 10 (the upper edges of the salient poles 12) than the edges 32a in the protruding direction D1. That is to say, the plurality of teeth 32 extends closer to the stator 10 (e.g. closer relative to the reference line designated by R1 in FIG. 1) as compared to the second portion 35 of the external tooth 33. As an example, protrusion lengths of the first portion 34 and the second portion 35 from the yoke 31 may be shorter than a protruding length of the first teeth 32 from the yoke 31.

In the protruding direction D1 of the second tooth 33, the edge 34a of the first portion 34 and the edge 35a of the second portion 35 may be on the upper side (the opposite side of the stator 10) with respect to an edge 60a of the second magnet 60. In other words, the edges 34a and 35a may be farther from the stator 10 (the upper edges of the salient poles 12) than the edge 60a in the protruding direction D1. That is to say, the outer magnet 60 of the outer magnetic unit 22 extends toward the stator 10, so as to extend closer to the stator 10 (for example closer relative to the reference line designated by R1 in FIG. 1) as compared with the first and second portions 34, 35 of the outer magnetic unit 22. In contrast, in the protruding direction D1 of the second tooth 33, the edges 32a of the first teeth 32 may be on the lower side (on the side close to the stator 10) with respect to edges 50a of the first magnets 50. In other words, the edges 32a may be closer to the stator 10 (the upper edges of the salient poles 12) than the edges 50a in the protruding direction D1. That is to say, the teeth 32 of the core units U1 extend closer to the stator (for example, closer relative to the reference line designated by R1 in FIG. 1) as compared with the core magnets 50.

In the first route R1, a center-to-center distance G1 between the adjacent second magnet 60 and first magnet 50 may be different from a center-to-center distance G2 between adjacent pairs of the first magnets 50 (for example, the first magnets 50 associated with the first magnetic poles 21A and 21B). For example, the center-to-center distance G1 may be larger than the center-to-center distance G2. That is to say, the plurality of magnets 32 comprises an end magnet 50 (associated with the first magnetic pole 21A) and an adjacent magnet 50 (associated with the first magnetic pole 21B), where the end magnet 50 is located between the adjacent magnet 50 and the external magnet 60, and where a center-to-center distance G2 between the end magnet 50 and the adjacent magnet 50 is different from a center-to-center distance G1 between the end magnet 50 and the external magnet 60. A center-to-center distance between another end magnet 50 (associated with the first magnetic pole 21L) and the external magnet 60 at an opposite end 21L of the plurality of magnets 32 may be defined by the same distance G1.

Hereinafter, the second tooth 33 and the second magnet 60 embedded within the second tooth 33 are collectively referred to as a second magnetic pole 22 of the mover 20. The mover 20 may have two of the second magnetic poles 22A, and 22B provided at the extremities of the plurality of first magnetic poles 21 in the direction of the first route R1, so as to sandwich the plurality of first magnetic poles 21 between the two second magnetic poles 22A, 22B, in the orientation of the first route R1. In other words, the mover 20 may include two pairings of the second teeth 33 and the second magnets 60 so as to sandwich the plurality of first magnetic poles 21 in the orientation of the first route R1.

It should be noted that the mover core 30 may be divided into a plurality of core units U1 (or "core units U1") arranged along the first route R1, and a core unit U2 (or "outer magnetic unit U2"). That is to say, the mover core 30 may comprise a magnetic pole assembly (i.e. the assembly of first magnetic poles 21A to 21L) that includes the core units U1, and may further comprise the outer magnetic unit U2. The plurality of core units U1 includes the plurality of first teeth 32, respectively. The core units U1 are thus arranged in succession along the route R1 (or the travel path) and extend toward the stator 10. The core units U1 include an end core unit 21A at an end 21A of the magnetic pole assembly. The core unit U2 includes the second tooth 33. The core unit U2 (or "outer magnetic unit" or "external magnetic unit") is associated with the second magnetic pole 22, and is positioned adjacent the end core unit 21A in order to adjust a magnetic flow path associated with the magnetic pole assembly. The outer magnetic unit U2 comprises the first portion 34, the second portion 35 and the outer magnet 60 sandwiched between the first portion 34 and the second portion 35. In this case, the plurality of core units U1 and the core unit U2 may be integrated by resin molding or may be made integrally together with a base member 70. In a case where the mover 20 includes two second magnetic poles 22 (at opposite ends 21A, 21L of the magnetic pole assembly), the mover core 30 may comprise the plurality of core units U1 and two core units U2. The two core units U2 (or "outer magnetic unit") associated with the outer magnetic poles 22, may be similarly configured to each include a first portion 34 and a second portion 35 having unequal lengths.

As described above, according to an example, the linear motor 1 includes the stator 10 provided along the linear first route R1, and the mover 20 that moves along the first route R1. The stator 10 includes the plurality of salient poles 12 arranged along the first route R1. The mover 20 includes the plurality of first teeth 32 arranged along the first route R1, protruding toward the stator 10; the plurality of coils 40 respectively mounted on the periphery of the plurality of first teeth 32; the plurality of first magnets 50 respectively embedded within the first teeth 32; the second tooth 33 provided outside the plurality of first teeth 32 in the first route R1, protruding toward the stator 10; and the second magnet 60 embedded within the second tooth 33. The second tooth 33 includes the first portion 34 on the opposite side of the first teeth 32 with respect to the second magnet 60; and the second portion 35 close to the first teeth 32 with respect to the second magnet 60. The edge 34a of the first portion 34 is farther from the stator 10 than the edge 35a of the second portion 35.

It is considered that cogging is mainly caused by magnetic flux that flows outward from the outermost first magnetic pole 21 (the first teeth 32) in the first route R1. It should be noted that the "cogging" represents fluctuations in force acting on the mover 20 along the first route R1 when the mover 20 moves while no AC power is supplied to the coils 40. First, with reference to FIG. 2, cogging for a mover that includes no second magnetic pole 22, will be described.

Figure 2:
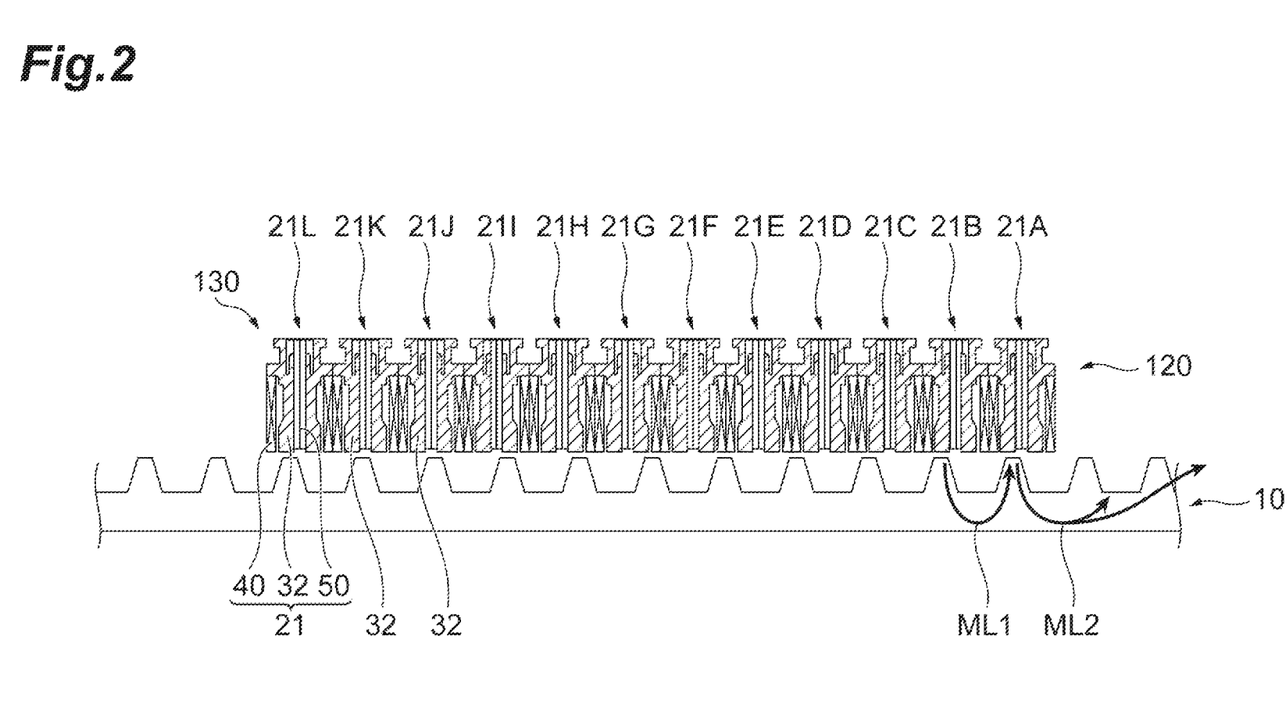
FIG. 2 is a schematic view illustrating a magnetic action in a linear motor that includes no second magnetic pole.

A mover 120 illustrated in FIG. 2 has first magnetic poles 21A to 21L as similar to the mover 20 and includes no second magnetic poles, such as the second magnetic poles 22A and 22B of FIG. 1. In other words, a mover core 130 of the mover 120 includes no second tooth, such as the second teeth 33 in FIG. 1. In a hypothetical situation where the magnetism from each of the first magnetic poles 21A to 21L (hereinafter, the magnetism from the individual magnetic pole is referred to as the "magnetism of the magnetic pole") acts equally on the salient poles 12, cogging generated in each of the first magnetic poles 21A to 21L (hereinafter, cogging which occurs in the individual magnetic pole is referred to as the "cogging in the magnetic pole") counteract each other, depending on positional relationships with the salient poles 12, which reduces the cogging in the mover 20 as a whole.

However in reality, magnetic actions of the first magnetic poles 21A to 21L with respect to the salient poles 12 are not equivalent. The actions greatly differ, particularly, between the outermost first magnetic poles 21A, 21L and the other first magnetic poles 21B to 21K. For example, the magnetism of the first magnetic poles 21B to 21K is guided to the adjacent first magnetic pole 21 through the stator 10 (refer to the magnetic field line ML1 illustrated in the drawing). On the other hand, a component of the magnetism of the first magnetic poles 21A and 21L that flows outside the first route R1 is not guided to the adjacent first magnetic pole 21 (refer to the magnetic field line ML2 illustrated in the drawing).

Figure 4:
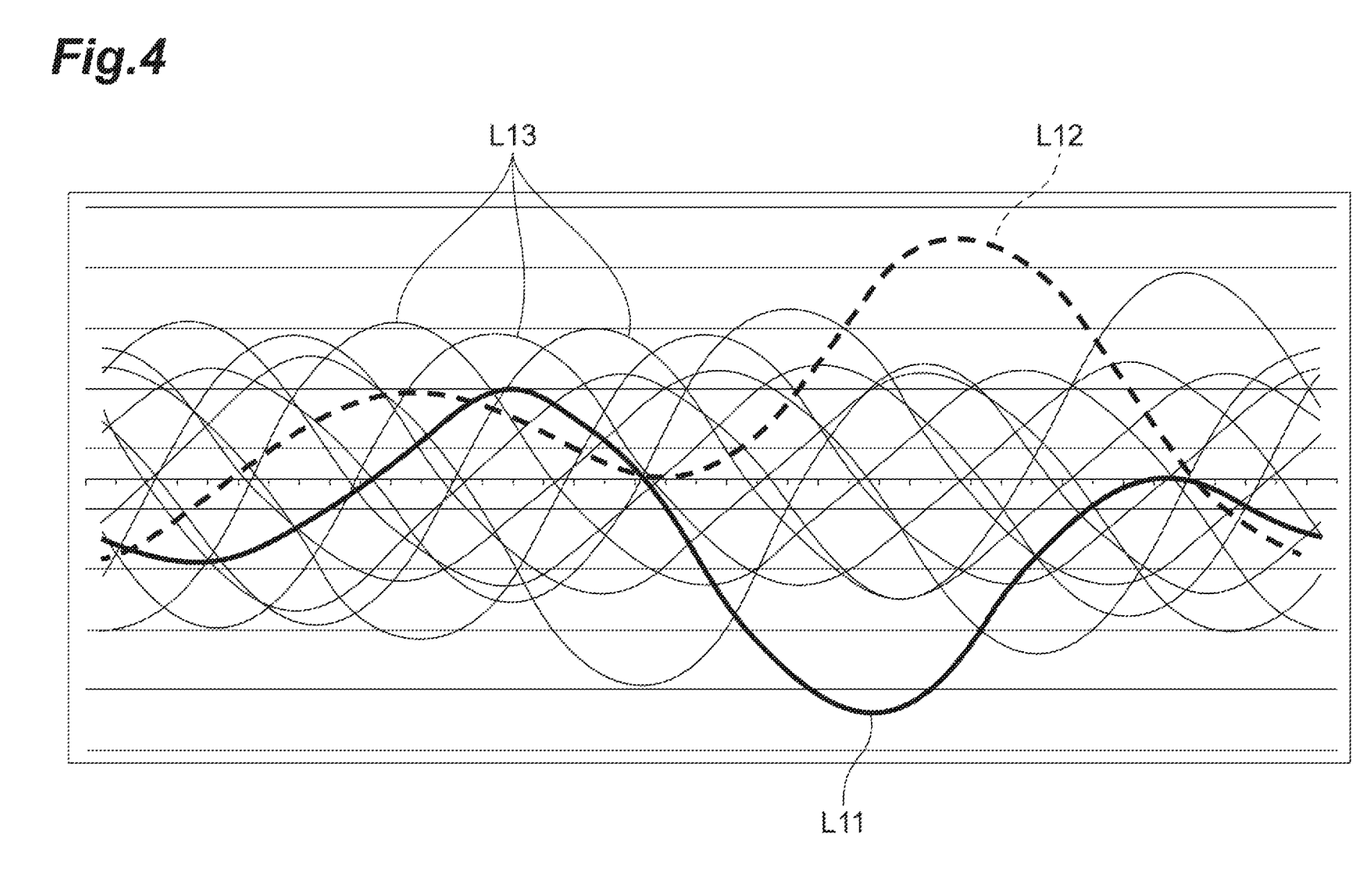
FIG. 4 is a graph illustrating simulation results of force acting on each magnetic pole in the linear motor of FIG. 2.

FIG. 4 is a graph illustrating simulation results of force acting on each of the first magnetic poles 21A to 21L (that is, force applied along the first route R1) when the mover 120 moves along the stator 10 while no AC power is supplied to the coils 40. In the graph, the abscissa represents the moving distance of the mover, and the ordinate represents the force along the first route R1. Force L11 of the thick solid line indicates the force acting on the first magnetic pole 21A; force L12 of the thick broken line indicates the force acting on the first magnetic pole 21L; and force L13 of the thin solid lines indicate the force acting on the first magnetic poles 21B to 21K. It is clear that the amplitude of the force L11 and L12 differs from that of the force L13. A phase difference between the force L11, L12 and the force L13 also differs from a phase difference between the force L13. In such a state, the cogging in the first magnetic poles 21A to 21F are synthesized, which leads to occurrence of cogging in the mover 20 as a whole.

Figure 3:
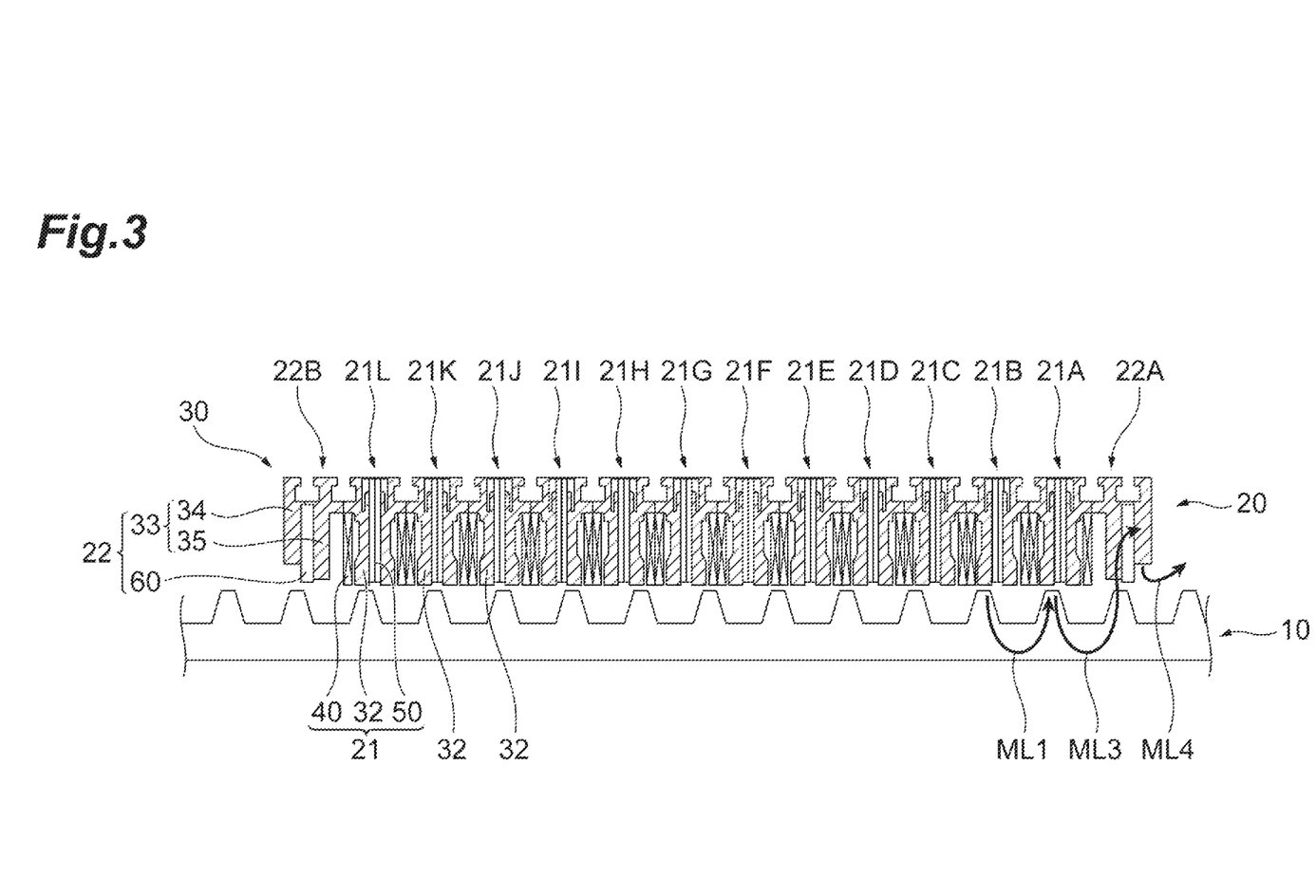
FIG. 3 is a schematic view illustrating a magnetic action in a linear motor that includes a second magnetic pole.

In contrast, when at least one of the second magnetic poles 22A and 22B is provided, as illustrated in FIG. 3, it is possible to adjust the magnetic flux path flowing outward from the outermost first magnetic poles 21A and 21L and to prevent and/or reduce the overall cogging, in the mover 20.

A component of the magnetism of the first magnetic poles 21A and 21L that flows outside the first route R1 is guided to the second magnetic pole 22 through the stator 10. The second tooth 33 includes the second portion 35 close to the first teeth 32 with respect to the second magnet 60; and the first portion 34 on the opposite side of the first teeth 32 with respect to the second magnet 60. Accordingly, it is possible to effectively utilize the magnetic force of the second magnet 60 and to reliably adjust the magnetic flux path flowing outward from the first magnetic poles 21A and 21L. Therefore, the magnetic actions of the first magnetic poles 21A and 21L with respect to the salient poles 12 (refer to the magnetic field line ML3 illustrated in the drawing) are approximate to the magnetic actions of the first magnetic poles 21B to 21K with respect to the salient poles 12 (refer to the magnetic field line ML1 illustrated in the drawing). The edge 34a of the first portion 34 is farther from the stator 10 than the edge 35a of the second portion 35. Accordingly, in the first route R1, the magnetism flowing outward from the second magnetic pole 22 is prevented or impeded from acting on the salient poles 12 (refer to the magnetic field line ML4 illustrated in the drawing). This minimizes or prevents cogging caused by the magnetism of the second magnetic pole 22.

Figure 5:
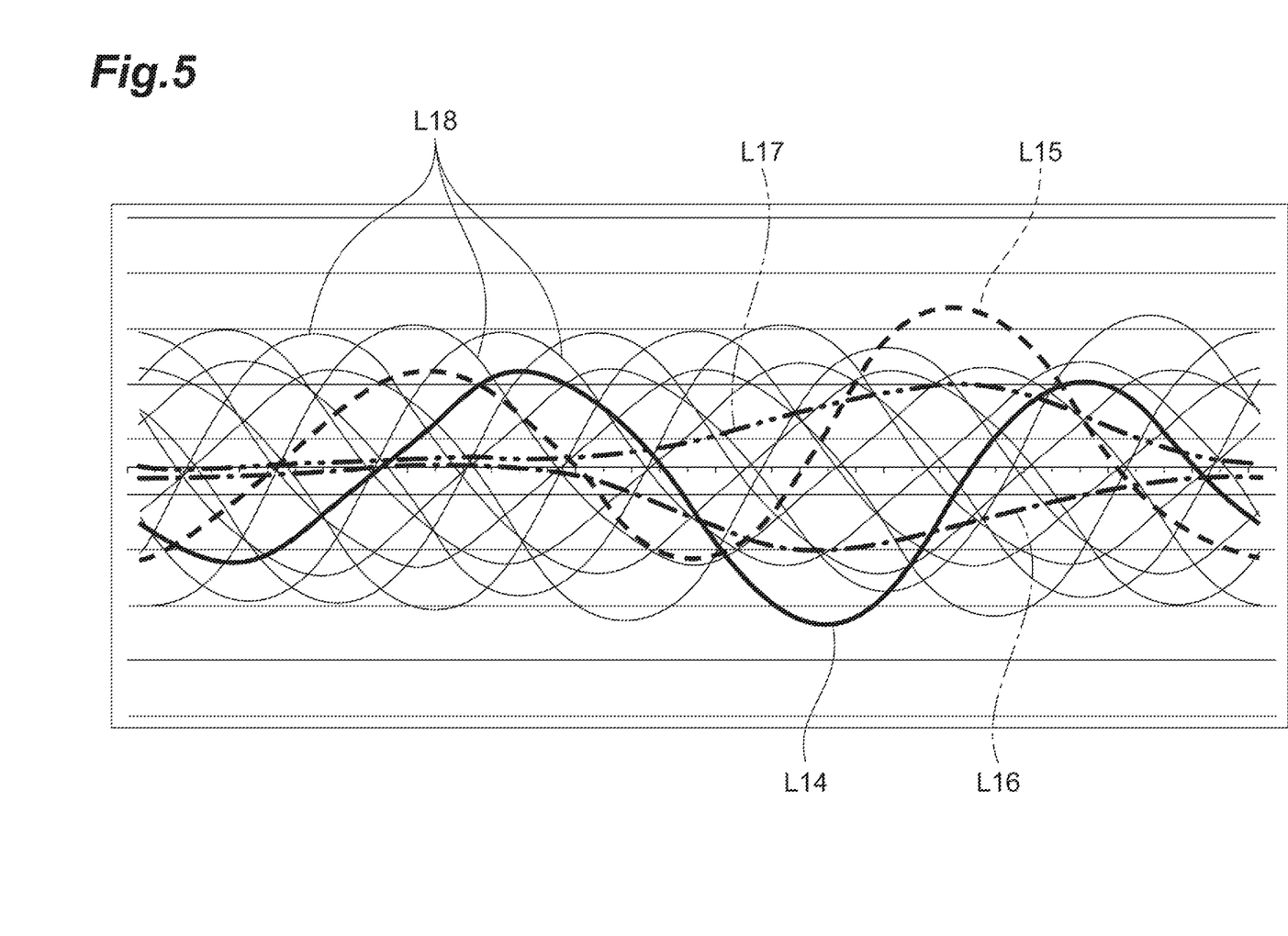
FIG. 5 is a graph illustrating simulation results of force acting on each magnetic pole in the linear motor of FIG. 3.

FIG. 5 is a graph illustrating simulation results of force acting on each of the first magnetic poles 21A to 21L and the second magnetic poles 22A and 22B (that is, force applied along the first route R1) when the mover 20 moves along the stator 10 while no AC power is supplied to the coils 40. In the graph, the abscissa represents the moving distance of the mover, and the ordinate represents the force along the first route R1. Force L14 of the thick solid line indicates the force acting on the first magnetic pole 21A; force L15 of the thick broken line indicates the force acting on the first magnetic pole 21L; and force L18 of the thin solid lines indicate the force acting on the first magnetic poles 21B to 21K.

Compared with FIG. 4, the amplitude of the force L14 and L15 is closer to the amplitude of the force L18. This indicates that the magnetic actions of the first magnetic poles 21A and 21L with respect to the salient poles 12 are approximate to the magnetic actions of the first magnetic poles 21B to 21K with respect to the salient poles 12.

In FIG. 5, force L16 of the thick dash-dotted line represents the force acting on the second magnetic pole 22A, and force L17 of the thick two-dot chain line represents the force acting on the second magnetic pole 22B. The amplitude of the force L16 and L17 is prominently smaller than the amplitude of the other force L14, L15 and L18. This indicates that the cogging due to the magnetism of the second magnetic pole 22 is reduced.

In such a manner, according to the linear motor 1, the magnetic action, with respect to the salient poles 12, of the outermost first magnetic pole 21 in the first route R1 matches or approximately matches the magnetic actions of the other first magnetic poles 21 with respect to the salient poles 12. In addition, the cogging due to the magnetism of the second magnetic pole 22 is reduced and/or eliminated. Therefore, it is possible to reduce and/or eliminate the overall cogging in the mover 20.

The edge 34a of the first portion 34 and the edge 35a of the second portion 35 may be farther from the stator 10 than the edges 32a of the first teeth 32. In this case, it is possible to further reduce any cogging due to the magnetism of the second magnetic pole 22.

In the first route R1, a center-to-center distance G1 between the adjacent second magnet 60 and first magnet 50 may be different from a center-to-center distance G2 between the adjacent first magnets 50. As the center-to-center distance G1 differs from the center-to-center distance G2, it is possible to adjust the phase of cogging due to the magnetism of the second magnetic pole 22 so as to counteract the cogging due to the magnetism of the plurality of first magnetic poles 21.

Figure 6:
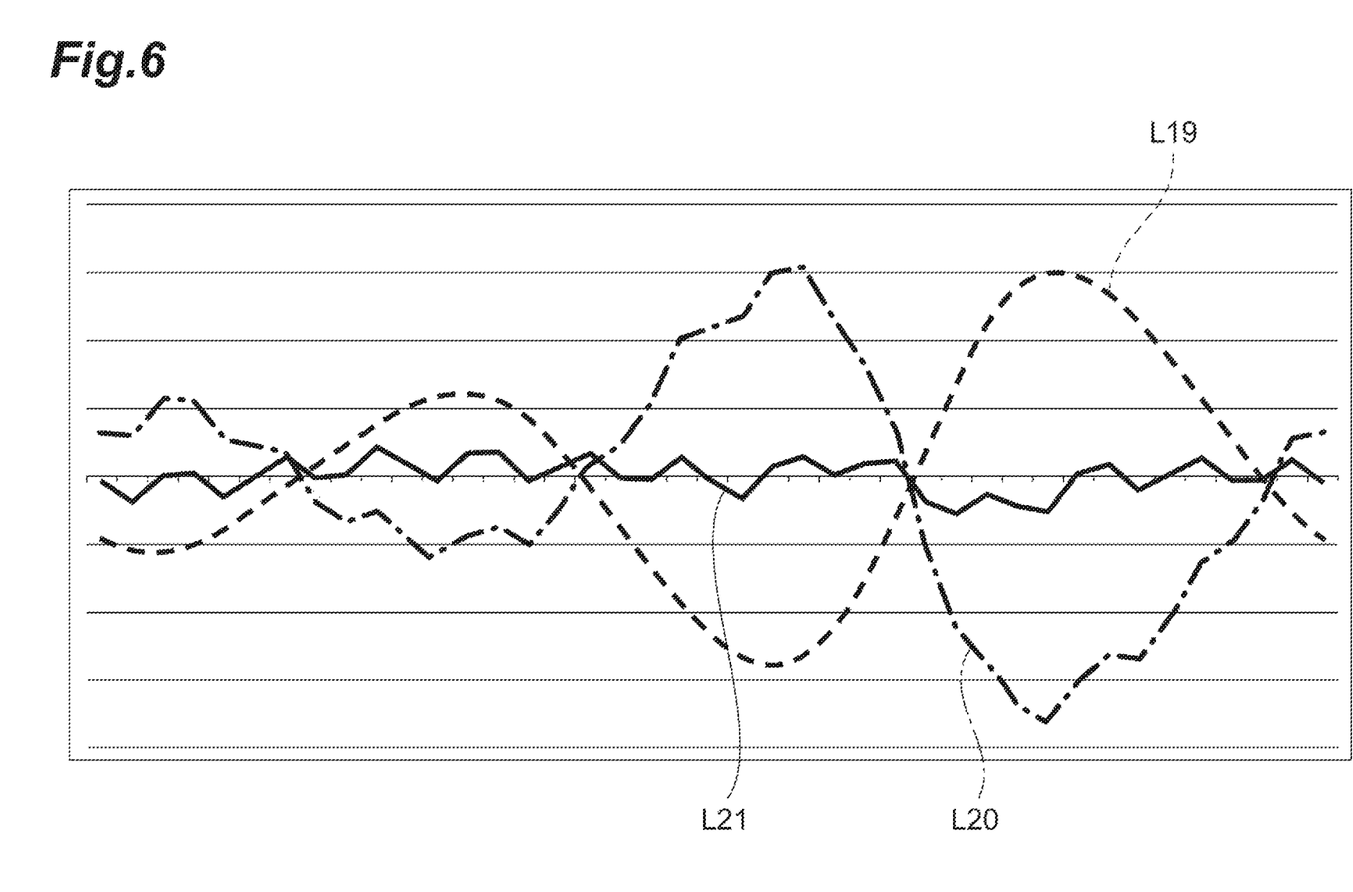
FIG. 6 is a graph illustrating a relationship between a sum of force acting on a plurality of first magnetic poles and a sum of force acting on the second magnetic pole.

FIG. 6 is a graph illustrating a relationship between a sum of the force acting on the first magnetic poles 21A to 21L (the force applied along the first route R1) and a sum of the force acting on the second magnetic poles 22A and 22B (the force applied along the first route R1) when the mover 20 moves along the stator 10 while no AC power is supplied to the coils 40. In the graph, the abscissa represents the moving distance of the mover, and the ordinate represents the force along the first route R1. A first waveform L19 shown with a thick broken line represents the sum of the force acting on the first magnetic poles 21A to 21L, and a second waveform L20 shown with a thick dash-dotted line represents the sum of the force acting on the second magnetic poles 22A and 22B. Thus, the first waveform L19 is associated with a magnetic force of the plurality of magnets 50 and the second waveform L20 is associated with a magnetic force of the pair of external magnetic units U2. The first center-to-center distance G1 and the second center-to-center distance G2 may be configured to phase shift the second waveform L20 relative to the first waveform L19, for example by approximately 180 degrees, in order to counteract a cogging effect of the plurality of magnets.

The force L20 is adjusted to have an opposite phase with respect to the force L19. Therefore, the amplitude of the force L21 obtained by adding the force L20 and the force L19 is close to zero. This indicates that the cogging due to the magnetism of the plurality of first magnetic poles 21 is counteracted by the cogging due to the magnetism of the second magnetic pole 22, and the cogging in the mover 20 is reduced as a whole. In this manner, it is possible to further reduce the cogging by adjusting the phase due to the magnetism of the second magnetic pole 22.

The mover 20 may have two pairs of second teeth 33 and second magnets 60 provided so as to sandwich the plurality of first teeth 32 in the first route R1. In this case, it is possible to further reduce the cogging by a coordinated action of the two pairs of the second tooth 33 and the second magnets 60. It should be noted that the mover 20 may have at least one pair of the second tooth 33 and the second magnet 60.

Although example embodiments have been described above, the present invention is not necessarily restricted to the aforementioned embodiments and may be modified within the gist of the present invention.

Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

The invention claimed is:

1. A linear motor comprising:
   a stator comprising a plurality of salient poles aligned along a linear path; and
   a mover configured to move along the linear path, and comprising:
      a plurality of teeth aligned along the linear path, wherein the plurality of teeth extend toward the stator;
      a plurality of magnets at least partially embedded in the plurality of teeth;
      an external tooth located outside the plurality of teeth in the linear path, wherein the external tooth comprises a first portion and a second portion that extend toward the stator; and
      an external magnet at least partially embedded between the first portion and the second portion of the external tooth,
   wherein the second portion is located between the external magnet and the plurality of teeth,
   wherein the second portion extends closer to the stator as compared to the first portion,
   wherein the plurality of magnets are arranged as pairs of adjacent magnets having magnetization directions that are opposite to each other,
   wherein the plurality of magnets comprises an end magnet adjacent the external magnet, and
   wherein a magnetization direction of the external magnet is opposite to a magnetization direction of the end magnet.

2. The linear motor according to claim 1, wherein the plurality of teeth extends closer to the stator as compared to the second portion of the external tooth.

3. The linear motor according to claim 1, wherein the plurality of magnets comprises an end magnet and an adjacent magnet, wherein the end magnet is located between the adjacent magnet and the external magnet, and wherein a center-to-center distance between the end magnet and the adjacent magnet is different from a center-to-center distance between the end magnet and the external magnet.

4. The linear motor according to claim 1, wherein the mover comprises a pair of external magnetic units comprising a first external magnetic unit that includes the external tooth and the external magnet, and a second external magnetic unit at an opposite end of the plurality of teeth so as to sandwich the plurality of teeth between the pair of external magnetic units in the linear path.

5. The linear motor according to claim 1, wherein the external magnet extends closer to the stator as compared with the first portion and the second portion of the external tooth.

6. The linear motor according to claim 1, further comprising a plurality of coils respectively wound about the plurality of teeth.

7. The linear motor according to claim 1, wherein the mover comprises a plurality of magnetic units arranged as pairs of adjacent magnetic units including the outer magnetic unit and the end core unit, and wherein the pairs of adjacent magnets have magnetization directions that are opposite to each other.

8. The linear motor according to claim 1, wherein the plurality of teeth extend closer to the stator as compared with the plurality of magnets.

9. A linear motor comprising:
   a stator comprising a plurality of salient poles arranged in succession along a travel path; and
   a mover configured to move along the travel path, the mover comprising:
      a magnetic pole assembly comprising core units extending toward the stator, the core units being arranged in succession along the travel path and including an end core unit; and
      an outer magnetic unit positioned adjacent the end core unit in order to adjust a magnetic flow path associated with the magnetic pole assembly,
   wherein the outer magnetic unit comprises a first portion, a second portion and an outer magnet sandwiched between the first portion and the second portion,
   wherein the second portion is positioned closer to the core units relative to the first portion, and the second portion extends closer to the stator as compared with the first portion, and
   wherein a magnetization direction of the outer magnetic unit is opposite to a magnetization direction of the end core unit.

10. The linear motor according to claim 9, wherein the mover comprises two outer magnetic units, including the outer magnetic unit, located at opposite ends of the magnetic pole assembly so as to sandwich the core units between the two outer magnetic units, and wherein the two outer magnetic units are similarly configured to include first and second portions having unequal lengths.

11. The linear motor according to claim 9, wherein a first distance is defined between a center of the outer magnetic unit and a center of the end core unit, wherein a second distance is defined between centers of adjacent core units, and wherein the first distance is different from the second distance.

12. The linear motor according to claim 11, wherein the first distance is greater than the second distance.

13. The linear motor according to claim 9, wherein the core units extend closer to the stator as compared with the first and second portions of the outer magnetic unit.

14. The linear motor according to claim 9, wherein the core units comprise teeth, core magnets within the teeth and coils wound around the teeth, wherein the teeth and the core magnets extend toward the stator, and wherein the teeth of the core units extend closer to the stator as compared with the core magnets.

15. The linear motor according to claim 14, wherein the teeth of the core units extend closer to the stator as compared with the outer magnet of the outer magnetic unit.

16. The linear motor according to claim 14, wherein the core magnets of the core units extend closer to the stator as compared with the first and second portions of the outer magnetic unit.

17. The linear motor according to claim 8, wherein the outer magnet of the outer magnetic unit extends toward the stator, so as to extend closer to the stator as compared with the first and second portions of the outer magnetic unit.

18. A linear motor, comprising:
   a stator comprising a plurality of salient poles aligned along a linear path; and
   a mover configured to move along the linear path, and comprising:

a plurality of teeth aligned along the linear path, wherein the plurality of teeth extend toward the stator;

a plurality of magnets at least partially embedded in the plurality of teeth;

an external tooth located outside the plurality of teeth in the linear path, wherein the external tooth comprises a first portion and a second portion that extend toward the stator; and an external magnet at least partially embedded between the first portion and the second portion of the external tooth, wherein the second portion is located between the external magnet and the plurality of teeth, wherein the second portion extends closer to the stator as compared to the first portion, and wherein the external magnet extends closer to the stator as compared with the first portion and the second portion of the external tooth.

* * * * *